Patented Dec. 3, 1940

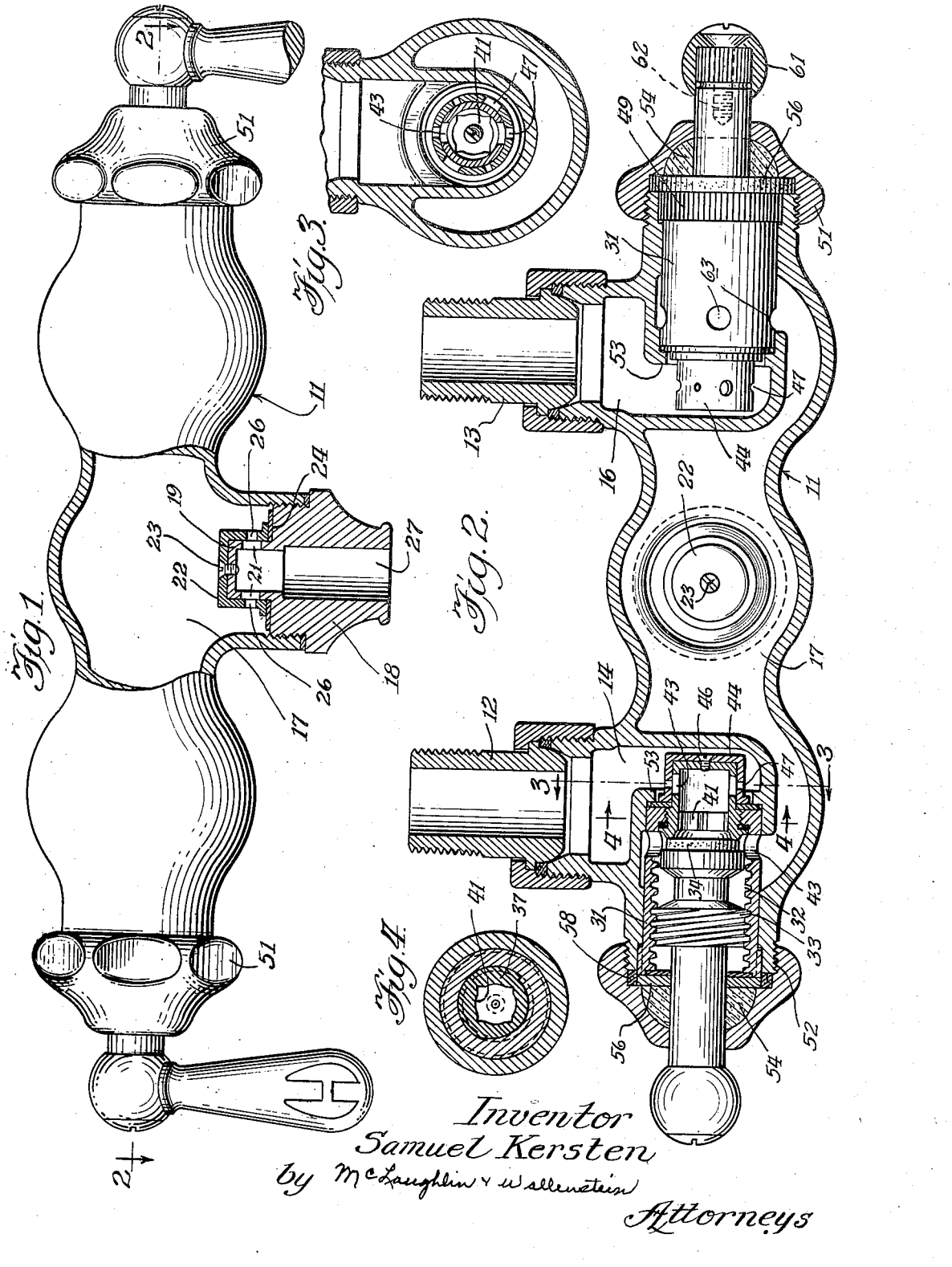

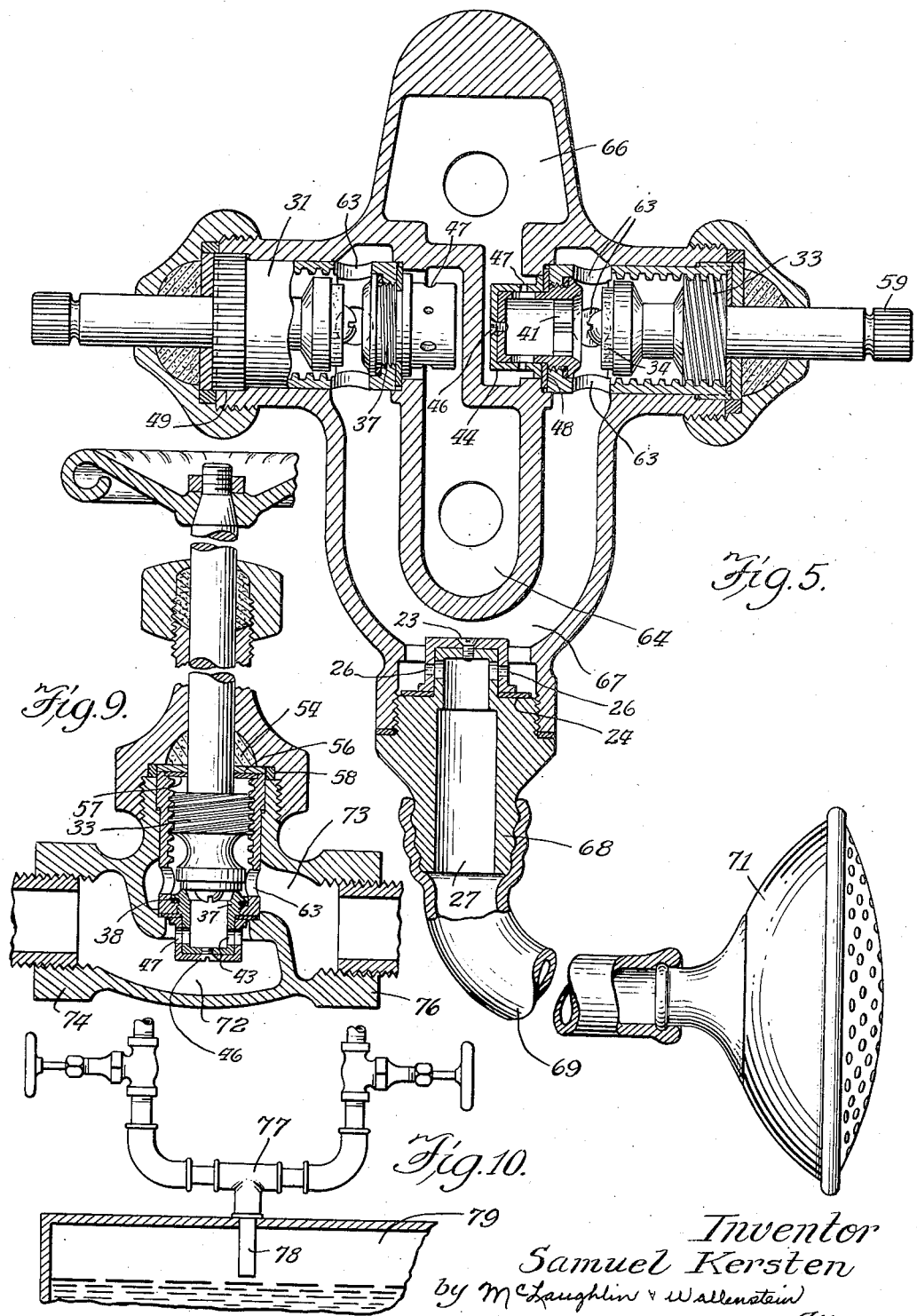

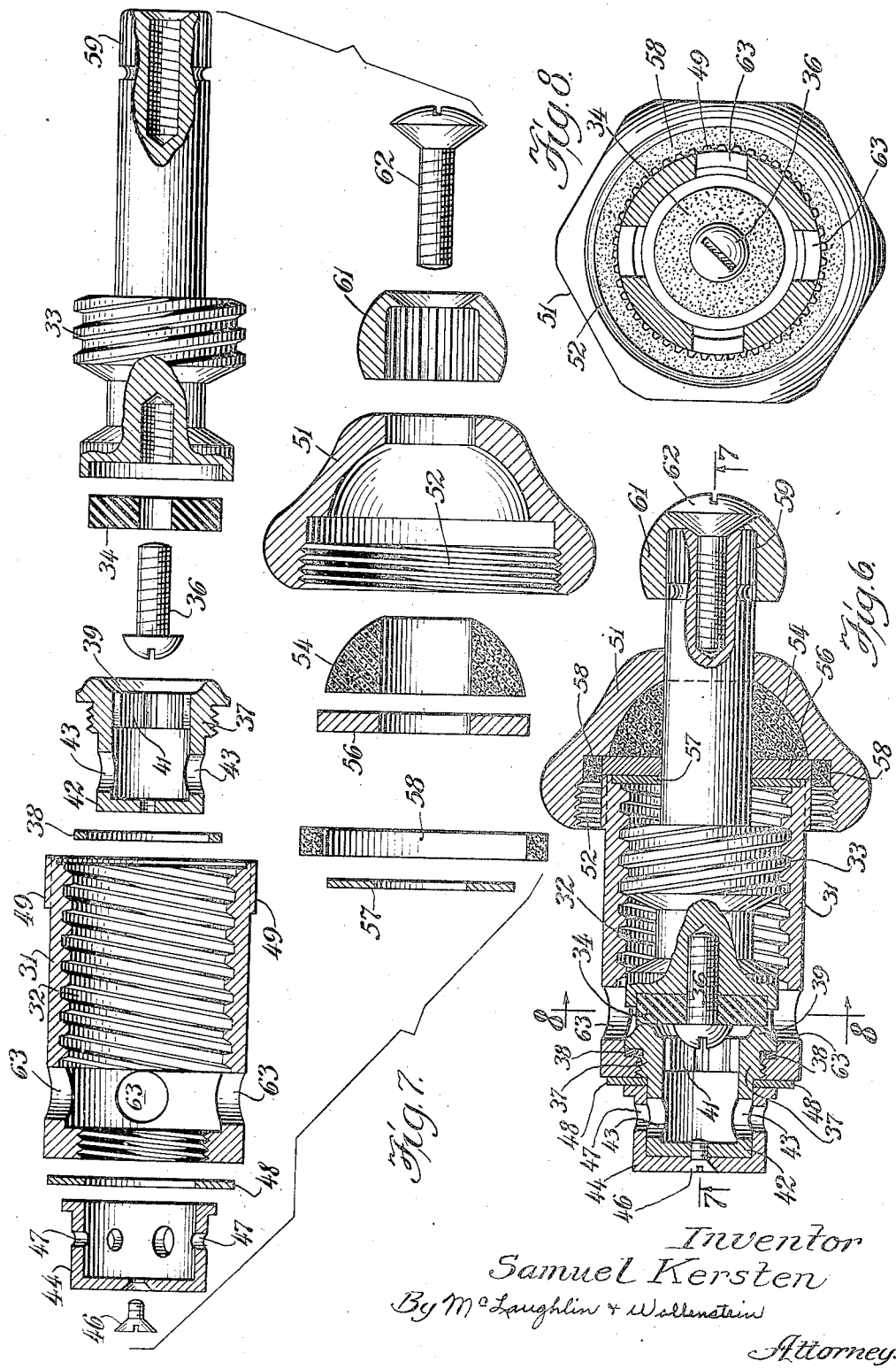

2,223,567

UNITED STATES PATENT OFFICE 2,223,567

VALVE APPARATUS

Samuel Kersten, Chicago, Ill.

Application March 17, 1938, Serial No. 196,313

3 Claims. (Cl. 277—67)

My invention relates to the control of water for household, industrial, and related uses. It relates more in particular to valves and faucets for controlling the amount of water, and to novel methods of and means for delivering requisite quantities of hot and cold water to produce tempered water at a predetermined desirable temperature, and for delivering controlled, predetermined amounts of said tempered water in accordance with the requirements for a particular use or installation.

Conventionally, in substantially all installations where water is used, it is customary to supply both hot and cold water and provide each hot and cold water line with valves or faucets, sometimes used in combination fixtures, for affording to the user means whereby he may get cold water alone, hot water alone, or tempered water produced by combining certain quantities of hot and cold water. By and large, in most cases, water intermediate in temperature is what the user will require, and, in many cases, the user wants substantially the same temperature in the tempered water most if not all of the time. It is understood, of course, that, where I speak of hot and cold water, I use these terms in the ordinary sense in which they are used, hot water being water heated in some type of heat exchange device and usually delivered at a temperature somewhat below boiling, and cold water as it is delivered in the mains without heating. It is understood, of course, that, and this will be referred to hereinafter, so-called cold water may vary somewhat in temperature depending upon the temperature of the supply, but, in general, hot water furnished in a particular installation will be of substantially uniform temperature, assuming the installation to be of adequate size and that the hot water is not wasted by excessive use.

In the present methods of handling water, it is customary for the user to control the valves placed in the hot water and cold water lines by turning the handles associated therewith until he has the water at the temperature which he believes he wants it. This is usually a slow and wasteful procedure, and void of any aspect of accuracy by its very nature. Furthermore, even after an adjustment is made, for example in a shower, manipulations of other valves in the same hot or cold water lines will so change the supply conditions (sometimes the term "robbing the line" is employed) that the adjustment will be disturbed and the user will no longer get the particular temperature of mixed water which he desires. There are many examples which could be used to illustrate the various statements made hereinabove. I have mentioned showers. Another example can be taken from the use of hot and cold water in the ordinary barber shop. The so-called "hot towel," which the barber uses during shaving to facilitate softening the beard, is brought to the right temperature by the use of proper combinations of hot and cold water. The barber will adjust the hot and cold water usually for some little time, notwithstanding the fact that continued practice gives him some facility, and even then the "hot towels" will vary in temperature. Sometimes he has a towel too hot and has to attempt to cool it before placing it on the face, and at other times it is not warm enough to be of any advantage. The barber depends, of course, only on his sense of feeling, and this is not accurate. Furthermore, in the process of adjusting the temperature of his water, he may get variations, or variations may occur because of another barber "robbing" the hot or cold water lines, so that it is not uncommon for a towel to have cold spots and hot spots, in other words not be uniform in temperature.

The principal object of my present invention is to improve methods of and means for handling water so as to overcome the disadvantages suggested in the discussion hereinabove.

Another object is to provide improved means and methods for controlling the flow of water, particularly to deliver predetermined amounts of tempered water having just the temperature desired for a particular use.

A further object is the provision of improvements in valve and faucet structures, particularly useful in providing tempered water but having uses and advantages where this phase of my invention is not directly employed.

In general, I accomplish the objects of my invention, particularly as expressed in the first stated object, by providing hot and cold water lines with valve connections of generally normal type for delivering substantially the full volume of water which normally could be delivered, taking into consideration the size of the line and the pressure thereon. Associated with the valves, however, and in the path of the water, I provide additional control means, adjustable to regulate the amount of water delivered through the normal valve mechanism, so that the water delivered to an outlet chamber from the hot and cold water lines is tempered to just the temperature desired for a particular use or purpose. In addition, I may provide means for delivering the flow of water from the outlet chamber so that the flow of the tempered water may be further regulated to just the amount required in a particular instance. Furthermore, I provide means for adjusting and controlling all of the features described, so that in different types of installations, under different conditions and the like, the temperature of the tempered water may at all times be maintained substantially uniform. My system provides the additional advantage in that, even though there be a plurality of outlets on a single line, one will not rob the other and substantially the same operating and control conditions are maintained independently of how many outlets may be in use.

Other objects and features of my invention will be apparent from the following detailed description taken with the accompanying drawings, wherein Fig. 1 is an elevational view, partly in section, embodying the features of my invention;

Fig. 2 is a transverse sectional view taken on the line 2—2 of Fig. 1, and illustrating the relative positions of the hot and cold water lines, part of the view being in elevation to facilitate illustrating some of the features;

Fig. 3 is a sectional view taken on the line 3—3 of Fig. 2, looking in the direction of the arrows;

Fig. 4 is a similar section taken on the line 4—4 of Fig. 2;

Fig. 5 is a vertical sectional view partly in elevation showing a somewhat modified form of combination faucet, and illustrating the application of a spray head to the outlet nozzle such as might be employed in barber shops and the like;

Fig. 6 is an enlarged sectional view, partly in elevation, showing a valve insert of the type employed in both the form of Fig. 2 and the form of Fig. 5;

Fig. 7 is an exploded sectional view taken on the line 7—7 of Fig. 6, the exploded parts being shown in two lines to facilitate setting them out separately;

Fig. 8 is a sectional view, taken on the line 8—8 of Fig. 6 looking in the direction of the arrows;

Fig. 9 is a valve assembly employing the same type of valve insert disclosed in connection with Figs. 2 and 5; and Fig. 10 illustrates the combination of the valve assembly of Fig. 9 with other fittings to produce a water control installation generally similar to that produced by the faucets shown in Figs. 1 to 8, inclusive.

Referring now first to Figs. 1 to 4, inclusive, I disclose a faucet body 11, to which hot and cold water lines 12 and 13 respectively are connected, in a suitable manner, to form a communication with hot and cold water inlet chambers 14 and 16 respectively. Each of the chambers 14 and 16 communicates through a valve and water control mechanism with an outlet chamber 17, so that all hot and cold water delivered from the chambers 14 and 16 is delivered to and mixed in the outlet chamber 17. A nozzle 18 is connected to the outlet chamber for delivering the water to a suitable receptacle or the like.

Between each inlet chamber 14 and 16 and the outlet chamber 17, I provide a usual type of valve which, if it were the only control means in the path of the water, would deliver substantially a full head of water through the passageways provided to the outlet chamber. In addition to the valve itself, however, I also provide adjustable means for restricting the flow of both the hot and cold water. This arrangement will be more fully described in connection with Figs. 6, 7 and 8, so that the structure per se will be made apparent. For the purpose of understanding the operation of the faucet of Figs. 1 to 4, inclusive, however, it will suffice for the moment to state that these controls are provided. In addition, however, I also provide means for delivering the tempered water from the outlet chamber 17 through the nozzle 18 in just the amounts desired. The nozzle 18 has a cup-shaped upper projection 19 provided with oppositely disposed openings 21. A cup-shaped control cap 22 fits snugly over the cup-shaped projection 19 and is held in place by a screw 23, a relatively soft metal washer 24 being provided at the flanged rim of the cup-shaped control cap where such cap contacts the shoulder at the top of the outlet around the cup-shaped projection 19. The cup-shaped control cap 22 is provided with a plurality of holes 26 arranged in pairs and facing each other, two holes only being shown in the drawing. The general arrangement, however, is similar to that subsequently to be described in connection with the separate controls for the hot and cold water, and so a further showing of this feature at the present time is unnecessary. The holes 26, while arranged in pairs, are also so arranged that each pair is of a different size and each designed to deliver a measured, predetermined quantity of tempered water through the nozzle orifice 27.

I shall now refer to the operation of the faucet so that a further consideration of the details of the water control elements will be made more clear and understandable.

As will be shown, and as has already been generally pointed out, the amount of hot and cold water delivered to the outlet chamber 17 when the valves have been completely opened (preferably I employ so-called quick opening types of valves) is definite and predetermined by the design and its adjustment. By this procedure, tempered water of exactly the right temperature can be delivered instantly through the nozzle orifice 27 by merely opening the two valves fully. In order to explain this, let us take certain specific examples.

Assume that the water is to be delivered to an outlet in a barber shop where hot water is to be employed but not sufficiently hot for sterilizing purposes. The conventional hot towel is an adequate illustration. We may assume that a temperature of 120 to 130 degrees F. is proper, and that a suitable volume at the outlet is one gallon of water per minute at this temperature. Let us assume, also, that the temperature of the hot water will be maintained substantially constantly at 180 degrees F., and that the temperature of the cold water will vary as much as from 35 to 60 degrees F. By calculation and by actual measurement over long periods of time, I have determined that, if an orifice be used in association with the valve at the hot water line, which will deliver 1½ gallons per minute, and a similar orifice employed in the cold water line which will deliver one gallon of cold water per minute, the temperature of the water at the outlet will vary, depending upon the temperature of the cold water, between 122 degrees F. and 132 degrees F. It will be noted, however, that, without any control over the outlet, the total water delivered will be one gallon plus one and one-half gallons, or a total of two and one-half gallons. Due to the control in the outlet, however, only the one gallon calculated to be all that is required will actually flow from the outlet. Thus, it is seen that, by the use of only a relatively small number of parts in the adjustable control mechanism employed in the path of the cold and hot water, I may obtain the temperature desired, and control the outlet so that just the right quantity of water is delivered. It is appreciated that a variation of twenty-five degrees (from 35 to 60 degrees F.) in the temperature of the cold water is a relatively wide variation, and many times the range will not be this great. It will be made clear also that I employ a very easily and quickly adjustable mechanism so that from winter to summer separate adjustments may be made on the cold water control mechanism; so that, whatever the variation in temperature may be, I may still maintain a more uniform temperature than indicated in the example. In other words, I may keep the range down to plus or minus two or three degrees of that calculated to be desired.

Other examples, assuming the same general conditions, namely that the cold water will vary from 35 to 60 degrees F. and the hot water will remain at substantially 180 degrees, are the following: In beauty parlors, for shampoo purposes, assume a temperature of around 100 degrees is desired and that two gallons of water per minute is what is desired in the spray heads. If 1½ gallons of cold water are delivered and 1 gallon of hot, the temperature at the outlet, under the most extreme conditions, will not vary between 93 and 100 degrees F. For dish washing, assume a temperature of 130 to 140 degrees is desired, and six gallons of water per minute at the outlet, then two gallons of cold water and four gallons of hot water may be supplied to the outlet chamber, and the maximum opening provided at the outlet nozzle. This gives six gallons of water per minute, and the temperature variation will be between 130 and 140 degrees F. A large number of additional examples which I have worked on might be given to illustrate the minimum variations from the desired temperatures, and to show the delivery of the amounts of water required for particular purposes. I have considered, for example, garages where cars are washed, the demands for general domestic use, laundry tray operations, public lavatories, uses in dairies, uses in public shower baths, and the like, and a large number of operations in processing work in factories, and in all instances the delivery of the amounts and temperature of water required has been facilitated with only minor variations in temperature of the water, and these minor variations capable of further control by adjustment when the temperature of the cold water varies. By and large, the temperature of hot water may be kept constant, but, should there be a change in the hot water temperature because of changes in equipment employed to heat it, or for any other reason, the same simple adjustments may be made on the hot water control mechanism. I have made in excess of 1500 calculations, in most cases accompanied with tests, employing varying amounts of hot and cold water at varying temperatures, and in all cases I have found that, by employing the equipment of my present invention, it is an extremely simple proposition to deliver substantially any desired quantity of tempered water consistent with the size of the lines and capacity of hot water heating plants, and maintain that quantity of water within a very few degrees of that desired for a particular purpose.

Referring now to Figs. 6 to 8, inclusive, which show the details of the valve assembly, and which may be considered with Figs. 1 to 4, inclusive, to illustrate the manner of incorporation with the valve body, Fig. 6 is an enlarged sectional view showing the parts in assembled relation, and Fig. 7 is a similar view showing the parts separated. I utilize a shell 31 having internal threads 32 in which a valve stem 33 is threaded. The end of the valve stem carries a valve gasket 34, this valve gasket being formed of suitable material such as fiber and inset as indicated into an annular space at the end of the valve stem body, a screw 36 holding it in position.

A removable valve seat member 37 is screwed into the apertured end of the shell 31, and is provided with a shoulder which engages against a washer 38 to make the connection tight. This valve seat member has an annular valve seat 39 which is engaged by the washer 34. An opening 41 is provided in the valve seat member through which the water passes, this opening being suitably shaped to receive a tool as indicated in Fig. 3. The valve seat member has a cup-shaped projection 42 provided with oppositely positioned apertures 43, of such a size as to accommodate substantially a full body of water which will pass the valve seat when the valve is open. A cup-shaped control member 44 is positioned over the cup-shaped projection 42, however, a snug but sliding fit being provided so that the member 44 may be rotated with respect to the member 42. A screw 46, however, holds the cup-shaped control member 44 in the position to which it is adjusted. This member 44 is provided with a plurality of pairs of openings 47, each pair of openings being of a different size and so controlled as to size that they will admit a predetermined, definite body of water under the conditions in which they are employed. Thus, any one of the plurality of pairs of openings may be positioned in line with the larger openings 43 to adjust the amount of water which reaches the valve proper. A gasket 48, preferably formed of thin, relatively soft metal, is disposed between the cup-shaped control member 44, a shoulder on the valve seat member and the flat end of the shell 31.

The shell is provided with a plurality of flutes 49 which, as indicated in Fig. 8, as well as in some of the other figures, cooperate with similar inside formations in the faucet or valve body to position the shell. A valve stem packing nut 51 extends around the end of the shell and has threads 52 which engage male threads on the faucet or valve body to hold the entire assembly in position. A web 53 is provided between the inlet and outlet chambers through which an annular passageway is provided, and this web is finished with a flat portion as indicated particularly in Fig. 2 against which the end of the shell 31 engages and is held during the entire time the device is assembled. The washer or gasket 48 is disposed between this flat portion of the web and the end of the shell when the valve stem packing nut 51 is drawn up tightly, the washer or gasket 48 thereby serving to pack the end of the shell as well as the space between the cup-shaped control member 44 and the removable seat member.

A valve stem packing gasket 54 extends up into the valve stem packing nut 51 and bears against the inside of this shell and also against one side of a metal retaining washer 56. A friction ring 57 is disposed at the opposite side of the retaining washer, and a body washer 58, preferably made of fiber or similar material, is disposed outside of the retaining washer 56 and against a shoulder provided on the inside of the packing nut 51. The end of the valve stem is fluted at 59 to fit a complementary and corresponding formation on the inside of a handle 61, the usual screw 62 being provided to hold the handle in position.

In addition to the water control aspects of my invention, there are obvious improvements and advantages in the arrangement of the valve assembly described immediately hereinabove. The entire assembly is readily placed in position by merely inserting it in the faucet or valve body and tightening up the valve stem packing nut. Tightening up this valve stem packing nut causes the washer or gasket 48 to seal the inner end of the shell and, of course, the outer end of the shell is sealed at the packing nut by the series of washers and gaskets employed. Moreover, friction is allowed for at this end so that, even after long periods of time, there is no tendency for the packing to become loose through wearing or tearing. Should the handle appear to be in an undesirable position when the assembly is placed in position, this may be adjusted for in the act of assembly by merely rotating the shell to a suitable position so that, when tightened up, the handle will always be in the correct position. Thus, it is not necessary, even though the faucet or valve is serviced, to remove the handle in order to change its position. In addition to providing for the renewable seat washer 34, I also provide for a renewable seat, as noted, which is very readily and simply renewed. When the assembly, as shown in Fig. 6, is removed from the body, the valve stem can be taken completely out by merely unscrewing it. Thus, by removing the screw 46, the member 44 is removed, and the valve seat member is then removed either by employing a tool in the opening 41, or more simply by inserting a center punch, nail, or any other handy object through the opening 43 and employing it as a tool for unscrewing the valve seat member. These features are in addition to the novel water control features and make for a long life of the entire assembly. This long life is further enhanced by the fact that, because of the use of the controlled apertures on the end of the shell which extends into the inlet chamber, the full head of water is not directly applied against the seat as in conventional structures. The water passes first through the apertures 47 and 43, then through the valve seat, and then through the apertures 63, four in number, as indicated in Fig. 8, but at least a suitable number so that the water has a free passage from the valve seat to the outlet chamber 17.

The number of openings in the cup-shaped control member 44 may, of course, vary. In the drawings, as illustrated in Fig. 3, I show only three sets of openings, this being adequate to illustrate the general arrangement. Moreover, these openings may be of any selected sizes, those shown in the drawing by no means being intended to be extremely accurate but only illustrative. This same general arrangement, as previously noted, is employed at the outlet nozzle 18.

The assembly illustrated in connection with Figs. 1 to 8, inclusive, may be employed in similar or modified form in many different types of valve and faucet bodies. In Fig. 5, I illustrate a somewhat more upright style of combination faucet, wherein the supply pipes are disposed in vertical relation generally, as indicated by the dotted lines, and are delivered into inlet chambers 64 and 66. The flow of water to an outlet chamber 67 is controlled by assemblies substantially identical with that previously described and illustrated in detail in Figs. 6 and 7. For this reason, I shall not describe these assemblies in detail but I have applied thereto the same reference characters employed in the previous figures. The outlet nozzle 18 is as described in connection with Fig. 5, with the same or similar outlet control, except that the outlet nozzle is provided with an extension 68 for the attachment of a hose 69. The other end of the hose has secured thereto a sprayhead 71 shown more or less conventionally.

In Fig. 9, I illustrate a conventional type of valve utilized in a line as shown in Fig. 10 to control the flow of water, but provided with the valve stem assembly features disclosed in the previous embodiments. The valve stem is vertical and has a somewhat modified valve stem packing means and valve stem packing nut which need not be described in detail as they are not important so far as my present invention goes. The main parts of the valve stem assembly, however, are substantially the same as previously described, and, to identify like parts, I employ the same reference characters utilized in Figs. 6 and 7. In this instance, however, a single inlet chamber 72 is provided and a single outlet chamber 73, the valve body being provided with bosses 74 and 76 into which pipes are threaded to receive and deliver the water. With a valve of this type, I may produce substantially the same general effect as obtained by the use of a combination valve or faucet, the outlets being delivered to a cross member 77 and thence to a discharge pipe 78. The pipe 78 may, if desired, be equipped with a delivery nozzle such as shown at 18 for controlling and directing the flow.

It is believed that most of the features of my invention are amply clear from the above description. I wish to make it clear, however, that, notwithstanding the fact that the orifices 47 in the control member may be relatively very small, they function under all circumstances to continue to deliver a measured quantity of water and also have the function of so maintaining the pressure on the lines that one outlet will not rob another and under substantially all circumstances the volume of water for which they are set will be delivered. Because these orifices face each other, they apparently clear each other so that accumulation of foreign matter will not occur such as would otherwise tend to clog them up. I have found that remarkably small orifices used in the manner in which I employ them will deliver fairly large quantities of water. This may be illustrated by the fact that an orifice produced by a No. 52 drill will deliver, under normal pressure, approximately one gallon of water per minute. It may be noted that even this small amount of water will fill the outlet of the usual discharge nozzle and produce a full, even stream.

The types of equipment illustrated in Figs. 1 and 5, for example, are primarily intended for use where appearance is of consequence, as, for example, in homes, offices, public lavatories, and the like. The form of installation shown in Fig. 10 is in general ample for industrial establishments where the only consideration is one of utility. In connection with industrial establishments, I have found that there are very many places such as tanneries and the like where water is required at a substantially constant but controlled temperature. Sometimes the amount delivered is required to be controlled, and at other times the only requirement is the delivery of a large volume of water at suitable predetermined temperature. For example, in Fig. 10, I indicate a vat 79 which, for example, may be a treating vat for hides. It may be that the only requirement is to fill this vat with water at the proper temperature in a relatively short period of time. In this case, separate control of the outlet would not be utilized, and the valves would be so designed as to deliver relatively large volumes of water, but still so differentiated in setting that the delivered water would be at the temperature desired.

While my invention contemplates the provision of a predetermined temperature of water and preferably the delivery of predetermined, definite quantities thereof, variations may be provided for as in usual installations which do not employ my invention. Hot water alone may be delivered, or cold water alone. By adjusting the handles of the valves, the relative quantities of hot and cold water delivered to the mixing chamber may be regulated, so that tempered water may be obtained of a different temperature than that predetermined by the settling of the control members alone. So far as the arrangement of parts in the cup shaped control member is concerned, considerable modification obviously may exist. I prefer the use of two parts, facing each other, but other arrangements may be provided, such as a plurality of single parts of graduating sizes. By the use of the control features of the character described, I predetermine the temperature of the water within the fixture, rather than in a bowl or the like into which the water is discharged.

In the examples given, the amount of water discharged is entirely illustrative. For example, in the case where I suggest the delivery of two gallons of water at the outlet, the discharge nozzle control may be adjusted to deliver one gallon, or one and one half gallons which may be found ample under many circumstances. I, therefore, combine, with the tempering feature, a water saving feature, which is of importance in installations where hot water is provided. I also save hot water, obviously, by the predetermined adjustment on the inlet which makes it unnecessary to waste the hot water while the user is attempting to adjust the temperature of the flow.

Another feature is that my control device as employed functions as a reducing valve, it being unnecessary to provide separate reducing valves to substantially equalize the various pressures on different pipe lines within the system.

In addition to other novel features of construction, it will be noted that there is substantially no wear on the body of my valve or faucet, since after the device is assembled, no moving part bears against the body itself.

Features of my invention, including structural features of the valve stem assembly, have been described in detail, but the features I particularly deem to be novel are set forth in the accompanying claims.

What I claim as new and desire to protect by Letters Patent of the United States is:

1. In a valve structure, a body having inlet and outlet chambers, an apertured partition between said chambers, a shell having one end sealed against said partition around the said aperture, means carried by the shell projecting into the inlet chamber for limiting the amount of water passing through said shell, a seat carried by the shell, a valve stem threaded in the shell, and a valve carried by the stem and adapted to engage said seat, said shell being apertured above the seat to pass water flowing through the shell into the outlet chamber.

2. An assembly for insertion into a valve body, comprising a shell, a removable seat member threaded into one end of the shell, a cup-shaped projection on the removable seat member having an aperture therein, a cup-shaped control member nested over said projection and having apertures adapted to be aligned with the aperture in the projection, a soft metal washer surrounding said projection, means for holding the cup-shaped control member on the projection with its rim sealed against said washer, a seat on said removable seat member within said shell, a valve stem threaded in the shell, and a valve carried by the stem, said shell being apertured near said seat to pass water which passes the valve, and said washer serving as a packing to seal the end of the shell when assembled within a valve body.

3. In a valve structure, a shell in the form of a substantially cylindrical tube having flutes near one outer end edge thereof, said tube being open at the end adjacent said flutes, a tubular extension at the opposite end of said tube, closed except for the provision of a passageway sufficiently small to limit the water passing therethrough to a predetermined amount at a given pressure, the inside of said tubular extension communicating with the inside of the said cylindrical tube, a seat within the shell, said cylindrical tube being apertured in the region of said seat, a valve stem threaded within said shell and carrying a valve adapted to engage said seat to prevent passage of water from said tubular extension into said tube, a valve body having inlet and outlet chambers separated by a ported flange running at right angles to the axis of the shell, said tubular extension projecting into the inlet chamber and the end of the cylindrical tube of the shell being sealed against said flange, said valve body having flutes cooperating with the flutes on the flange whereby the shell may be introduced at any radial position to position a handle carried by the valve stem without the requirement of removing said handle therefrom.

SAMUEL KERSTEN.